(12) United States Patent
Zheng et al.

(10) Patent No.: US 7,676,125 B2
(45) Date of Patent: Mar. 9, 2010

(54) METHOD AND APPARATUS TO PROVIDE MULTI-CHANNEL BULK FIBER OPTICAL POWER DETECTION

(75) Inventors: Xuezhe Zheng, San Diego, CA (US); Shifu Yuan, Camarillo, CA (US); Roger Helkey, Montecito, CA (US); Marduke Yousepfor, San Jose, CA (US); Charles Matthew Corbalis, Saratoga, CA (US); Chandrasekhar Pusarla, San Jose, CA (US)

(73) Assignee: Calient Networks, Inc., San Jose, CA (US)

( * ) Notice: Subject to any disclaimer, the term of this patent is extended or adjusted under 35 U.S.C. 154(b) by 232 days.

(21) Appl. No.: 11/764,716

(22) Filed: Jun. 18, 2007

(65) Prior Publication Data

US 2008/0002932 A1    Jan. 3, 2008

Related U.S. Application Data

(60) Provisional application No. 60/815,057, filed on Jun. 19, 2006.

(51) Int. Cl.
*G02B 6/26* (2006.01)
*G02B 6/42* (2006.01)

(52) U.S. Cl. ............... 385/18; 385/15; 385/16; 385/47; 385/89

(58) Field of Classification Search .......... 385/18
See application file for complete search history.

(56) References Cited

U.S. PATENT DOCUMENTS

| | | | |
|---|---|---|---|
| 4,941,724 A | 7/1990 | Couden et al. | |
| 5,555,330 A | 9/1996 | Pan et al. | |
| 5,900,983 A | 5/1999 | Ford et al. | |
| 6,049,412 A | 4/2000 | Bergmann et al. | |
| 6,198,856 B1 | 3/2001 | Schroeder et al. | |
| 6,249,626 B1 | 6/2001 | Bergmann | |
| 6,278,812 B1 | 8/2001 | Lin et al. | |
| 6,289,145 B1 | 9/2001 | Solgaard et al. | |
| 6,320,993 B1 | 11/2001 | Laor | |

(Continued)

FOREIGN PATENT DOCUMENTS

EP    1120989 B1    4/2003

(Continued)

OTHER PUBLICATIONS

Fermionics, HgCdTe Detectors and Arrays, accessed from the Internet on Jul. 7, 2009, published on the Internet on Feb. 2, 2006 at http://web.archive.org/web/20060202105905/http://fermionics.com/; (3 pages).

*Primary Examiner*—Frank G Font
*Assistant Examiner*—Mary A El Shammaa
(74) *Attorney, Agent, or Firm*—Blakely, Sokoloff, Taylor & Zafman LLP (57) ABSTRACT

An apparatus is described to provide multi-channel bulk optical power detection. The apparatus has a plurality of optical splitters coupled to respective fiber-optic lines of a plurality of fiber-optic lines. An optimal time-division multiplexer has an input coupled to the plurality of optical splitters. A photodetector is coupled to an output of the optical time-division multiplexer to provide bulk optical power detection. The optical time-division multiplexer includes a scanning mirror.

20 Claims, 9 Drawing Sheets

U.S. PATENT DOCUMENTS

| | | |
|---|---|---|
| 6,396,976 B1 * | 5/2002 | Little et al. .................... 385/18 |
| 6,411,751 B1 | 6/2002 | Giles et al. |
| 6,456,751 B1 | 9/2002 | Bowers et al. |
| 6,525,871 B2 | 2/2003 | Kosaka |
| 6,549,692 B1 | 4/2003 | Harel et al. |
| 6,668,108 B1 | 12/2003 | Helkey et al. |
| 6,735,394 B1 | 5/2004 | Yue et al. |
| 6,753,960 B1 * | 6/2004 | Polynkin et al. ............ 356/330 |
| 6,792,177 B2 | 9/2004 | Welsh et al. |
| 6,819,815 B1 * | 11/2004 | Corbalis et al. ............... 385/16 |
| 6,904,195 B2 | 6/2005 | Bowers et al. |
| 7,127,137 B2 | 10/2006 | Bowers et al. |
| 7,263,253 B2 * | 8/2007 | Davis et al. ................... 385/18 |
| 7,379,668 B2 | 5/2008 | Blumenthal |
| 2003/0058497 A1 | 3/2003 | Park et al. |

FOREIGN PATENT DOCUMENTS

| | | | |
|---|---|---|---|
| WO | WO 01/39413 A2 | 5/2001 |

* cited by examiner

METHOD AND APPARATUS TO PROVIDE MULTI-CHANNEL BULK FIBER OPTICAL POWER DETECTION

CROSS-REFERENCE TO RELATED APPLICATION

The present application claims the priority benefit of U.S. Provisional Patent Application No. 60/815,057, entitled MULTI-CHANNEL BULK FIBER OPTICAL POWER DETECTION WITH SCANNING MIRROR, filed Jun. 19, 2006, which is hereby incorporated by reference.

FIELD

Embodiments of the invention pertain to optical networks and optical switching. More particularly, embodiments of the invention relate to optical power detection for multiple fiber-optic lines.

BACKGROUND

To detect the optical signal power in an optical fiber, typically a fiber splitter is used to get a portion of the signal and a fiber pigtailed photo detector is used to measure the optical power. In fiber-rich applications, in particular like a large scale photonic switch, the cost of the power detection could be significant since every fiber needs a power receiver which includes a fiber pigtailed photo detector plus associated electronics.

SUMMARY

An apparatus is described to provide bulk optical power detection. The apparatus has a plurality of optical splitters coupled to respective fiber-optic lines of a plurality of fiber-optic lines. An optical time-division multiplexer has an input coupled to the plurality of optical splitters. A photodetector is coupled to an output of the optical time-division multiplexer to provide bulk optical power detection. For one embodiment, the optical time-division multiplexer includes a scanning mirror.

An apparatus is also described that includes a fiber collimator array, a first lens, a second lens, a scanning mirror, and a photodetector array. The first lens receives optical signals from the fiber collimator array. The scanning mirror transmits optical signals from the first lens to the second lens. The photodetector array receives optical signals from the second lens to provide bulk optical power detection.

Other features and advantages of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings in which like references indicate similar elements.

DETAILED DESCRIPTION

Systems, apparatuses, and methods are described for bulk power detection of optical signals. For one embodiment, an optical switching system includes an optical switch that receives a plurality of fiber-optic lines. A plurality of optical splitters are coupled to respective fiber-optic lines. An optical time-division multiplexer having an input is coupled to the plurality of optical splitters. A photodetector is coupled to an output of the optical time-division multiplexer to provide bulk optical power detection of a plurality of fiber-optic lines with a single photodetector or a single array of photodetectors. Optical splitters using fiber-optics are available from Corning Incorporated of Corning, N.Y. Other known methods of splitting optical light may be used to implement the optical splitters, such as generating an array of collimated optical beams, and splitting the light with a partially transmitting mirror which reflects a portion of the optical beam at an angle. Partially transmitting mirrors are available from Newport Corporation of Irvine, Calif.

The optical time-division multiplexer includes a scanning mirror, a first lens, and a second lens. The first lens and the second lens may be a single optical element traversed a first time and a second time by each optical beam. The scanning mirror may include one of an electrostatic microelectromechanical system (MEMS) mirror, an electromagnetic microelectromechanical system (MEMS) mirror, and a motor-driven gimble mirror.

An intended advantage of the optical switching system having a large number of fiber-optic lines is the ability to provide bulk power detection of these fiber-optic lines with minimal low cost circuitry including a single photodetector or a single one dimensional array of photodetectors. For one embodiment, a large number of fiber-optic lines or channels share the same optical power receiver having a single photodetector.

For another embodiment, a bulk power detection apparatus receives a large number of channels that share the same optical power receiver having a single photodetector or a one-dimensional array of photodetectors. The apparatus includes a fiber collimating array, a single optical element, and a scanning mirror. The apparatus provides the bulk power detection in a limited space requirement based on having only a single optical element and a scanning mirror to minimize the number of the photodetectors.

Figure 1:
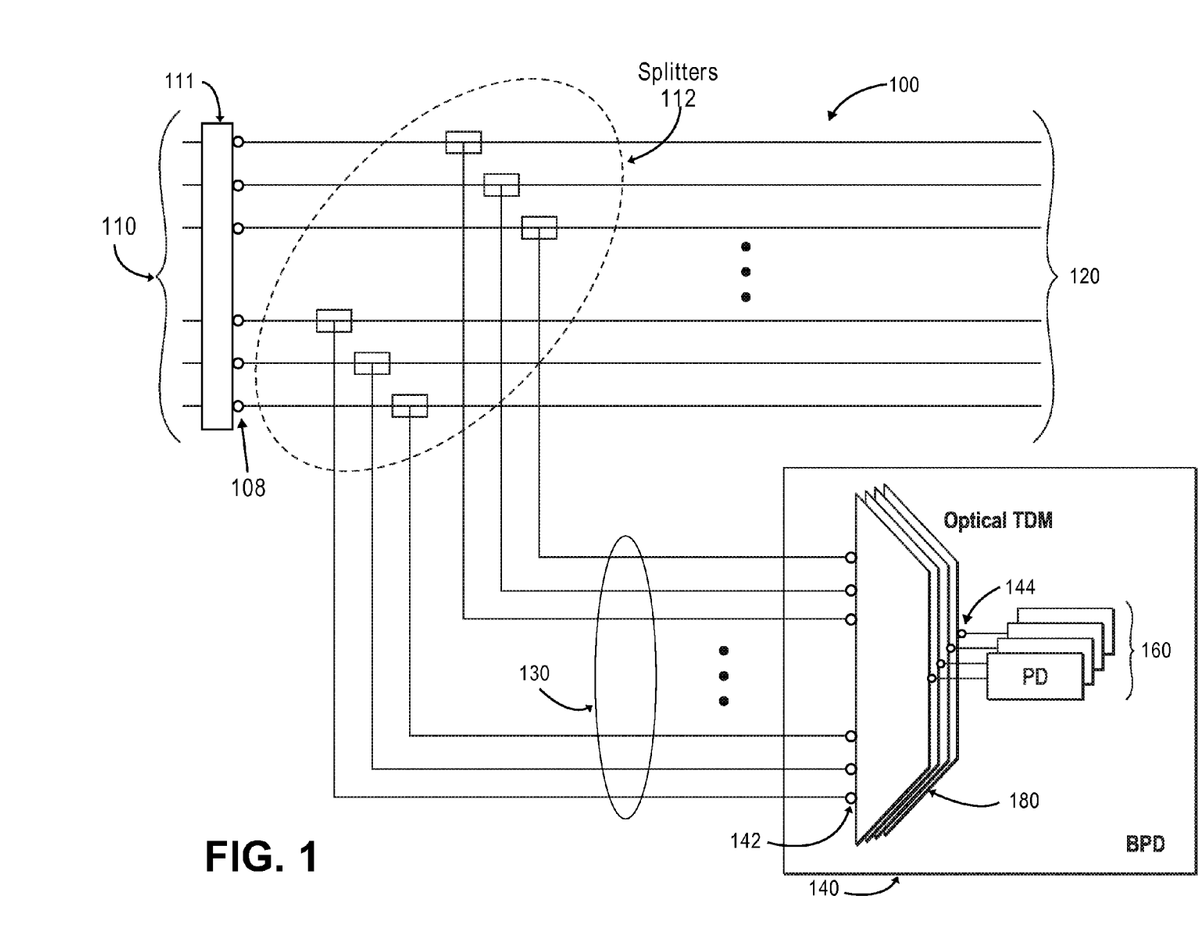
FIG. 1 shows an example of an optical switching system with multiple fiber-optic lines, an optical switch, multiple optical splitters, and a bulk power detector in accordance with an embodiment of the present invention.

FIG. 1 shows an example of an optical switching system 100 to which embodiments of the present invention can be applied. Such a switching system can be used for digital communications carried by the optic fibers. The signals may represent any type of data, such as voice, audio, video, or any other type of information. The optical switching system 100 may include, for example, a 3-dimensional optical switch 111 that allows for optical coupling between input optic fibers 110 and output optic fibers 120 in different planes using lens arrays and mirror arrays which are not shown in FIG. 1. The lens arrays and mirror arrays provide proper angle and position of the light beams traveling from input fibers 110 to output fibers 120.

The input fibers 110 may form an input fiber array. A few hundred optical fibers can be used although the particular number will depend on the implementation. A smaller number of fibers are shown in FIG. 1 in order to simplify the drawing. The input fibers 110 are positioned in a fiber block that holds the fibers in a fixed position. The fiber block can be created by inserting the fibers into the block, fixing them in position and then polishing the end face of the block. This makes a flat smooth exit surface for light from all of the fibers. It also provides a smooth surface to which other components can be attached or aligned.

One way to reduce the cost of power detection for multiple channel fiber-optic applications is to reduce the number of the power receivers needed, or in other words, to have many channels share the same optical power receiver, as shown in FIG. 1. The fiber splitters 112 tap off optical signals in all the fiber ports 110 for bulk power detection ("BPD") in an apparatus 140 in which a single photodetector 160 or an array of photodetectors 160 measures the power of the tapped signals 130 in serial through the use of an optical time-division multiplexing ("TDM") apparatus 180.

One way to reduce the cost of power detection for multiple channel fiber-optic applications is to reduce the number of the power receivers needed, or in other words, to have many channels share the same optical power receiver, as shown in FIG. 1. The fiber splitters 112 tap off optical signals in all of the input fibers for bulk power detection in the apparatus 140 in which a few photodetectors 160 measure the power of the tapped signals in serial through the use of an optical time-division multiplexing ("TDM") apparatus 180. In FIG. 1, the apparatus 140 measures the output power of the output fibers 120. Alternatively, the apparatus 140 can measure the input power of the input fibers 110. The lens arrays and mirror arrays of the switch 111 can then be adjusted properly to switch the light beams traveling from input fibers 110 to output fibers 120.

For one embodiment, the optical switching system 100 includes the optical switch 111 that is coupled to respective fiber-optic lines 110 of a plurality of fiber-optic lines. A plurality of optical switch outputs is coupled to the optical switch 111. The optical splitters 112 are coupled to respective plurality of optical switch outputs 108. The optical time-division multiplexer 140 has at least one input 142 coupled to the plurality of optical splitters 112. The photodetectors 160 are coupled to at least one output 144 of the optical time-division multiplexer 140 to provide bulk optical power detection. The number of photodetectors 160 is less than the number of optical switch outputs 108.

Figure 2:
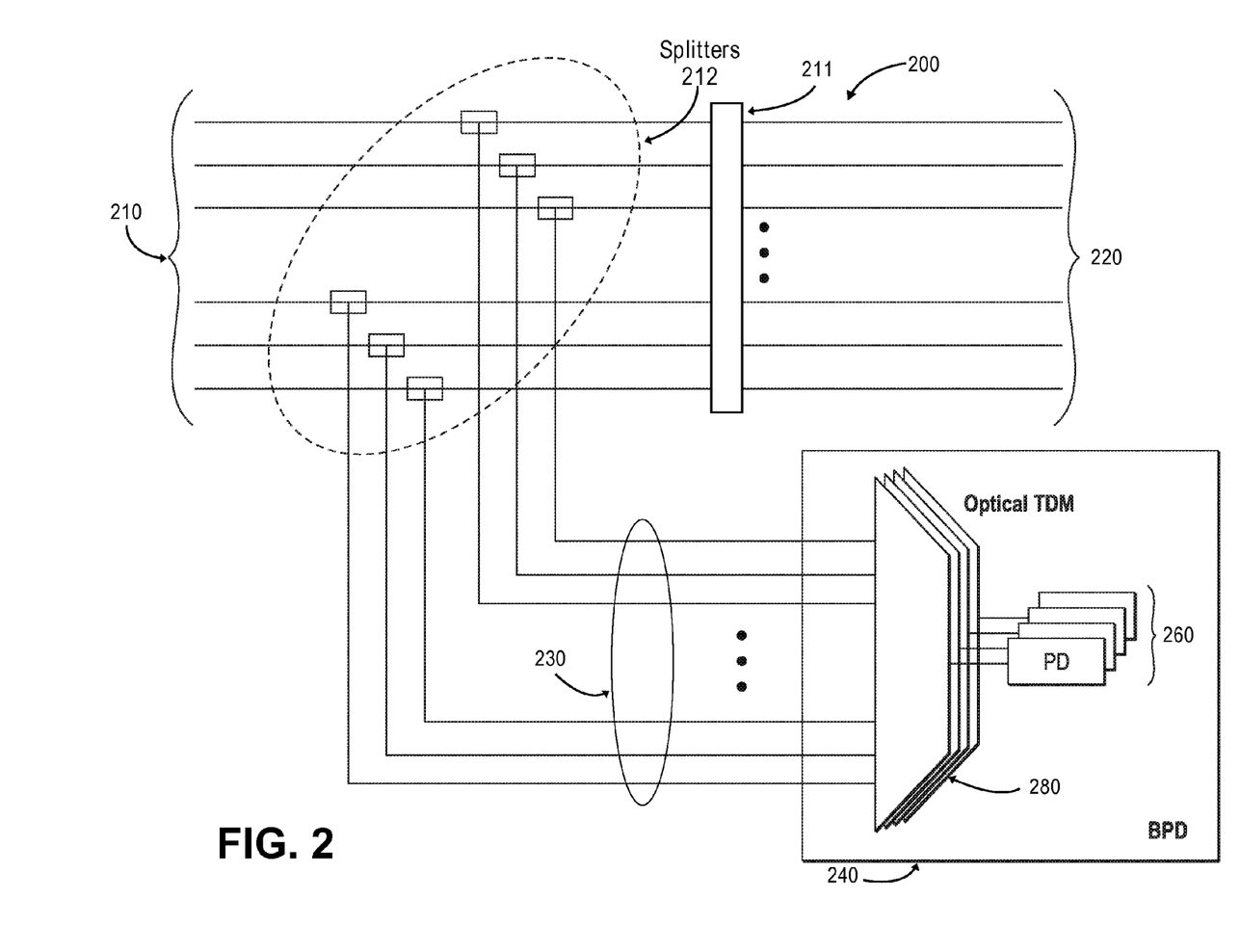
FIG. 2 shows an example of an optical switching system with multiple fiber-optic lines, multiple optical splitters, and a bulk power detector in accordance with an alternate embodiment of the present invention.

FIG. 2 shows an example of an optical switching system with multiple fiber-optic lines, multiple optical splitters, and a bulk power detector in accordance with an alternate embodiment of the present invention. An optical switch 211 receives the fiber-optic lines 210. Splitters 212 tap off optical signals 230 from the fiber-optic lines 210. These optical signals 230 are received by one or more multiplexers 280 of the bulk power detector 240. In one embodiment, a single array of photodetectors 260 measures the power of the optical signals 230 through the use of the one or more multiplexers 280. In contrast to FIG. 1, the apparatus 240 measures the input power of the fiber-optic lines or input fibers 210.

Figure 3:
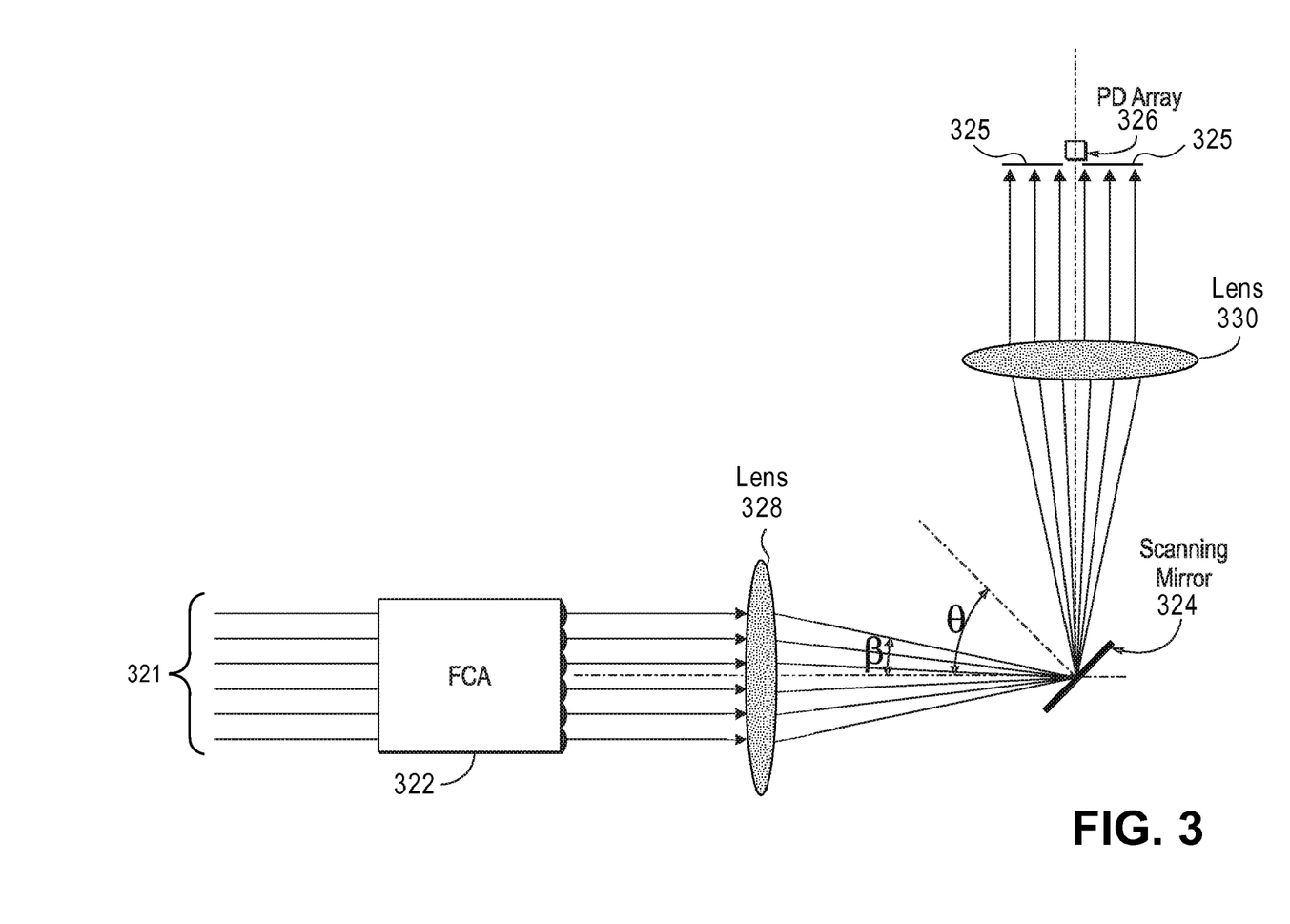
FIG. 3 is a schematic of a multi-channel bulk power detection ("BPD") apparatus that includes a fiber collimator array ("FCA"), lenses, a scanning mirror, and a photodetector ("PD") array in accordance with an embodiment of the present invention.

FIG. 3 is a schematic of a multi-channel bulk power detection apparatus that includes a fiber collimator array ("FCA"), lenses, a scanning mirror, and a photodetector ("PD") array. The BPD via optical TDM can be implemented with fiber collimator array ("FCA") 322, a scanning mirror 324, a photo detector (PD) 326 (or a PD array 326), and free space optics, as shown in FIG. 3.

The FCA 322 collimates the tapped optical signals 321 into an array of free space beams. These beams are parallel to each other and spatially separated from each other. Two lenses 328 and 330 with the scanning mirror 324 on their confocal point form a 1 to 1 imaging or beam relay system. The beam waist plane where the beam reaches the smallest size of the FCA 322 is set to be on the front focal plane of lens 328. The PD or PD array 326 is set to the back focal plane of lens 330.

An array of scanning beams is formed around PD array 326. The time division multiplexing is performed by rotating scanning mirror 324, which scans these beams across PD array 326. The PD array 326 produces electrical current proportional to the optical power of the corresponding beam which is incident on each photodetector of the PD array 326. One source of photodetectors is Fermionics of Simi Valley, Calif. The optical power in each beam can be measured sequentially by scanning mirror 324.

In one embodiment, the PD array 326 includes an aperture plate 325 having an opaque shield with non-opaque apertures defining a location of an active photodetector region that is designed to absorb light. The aperture plate 325 prevents illumination of the PD array 326 outside of the active photodetector region because the area outside of the designed active photodetector region is known to produce a slow transient response in some photodetector structures.

A system folding angle θ can be adjusted according to packaging constraints (45° is shown in FIG. 3). A smaller folding angle helps to maximize optical performance in terms of both optical loss and polarization dependent loss ("PDL"). In order to measure the optical power in each beam, the mirror scan angle shall be slightly bigger than half of the cone angle β of the beam array, which is determined by the width of the beam array and the focal length of the two lenses 328 and 330.

If the scanning mirror 324 is capable of a 2-axes scan, then only one PD is needed for all the beams, although more than one PD can be used. If the scanning mirror 324 only scans in one axis, then the PD array 326 is used for one embodiment. Photodetectors in PD array 326 can be positioned in a one dimensional array such that the distance between each photodetector and a line defining the center of the PD array 326 is much less than the maximum distance between photodetectors in PD array 326.

If a PD array pitch is different from a FCA pitch, then the focal length of the two lenses 328 and 330 are designed to have the image beam array of the FCA beam array to match the PD array pitch. For one embodiment, the PD array pitch is approximately 0.645 millimeters (mm) and the beam pitch is approximately 0.616 mm.

The lens focal lengths ($f_1$ of lens 328 and $f_2$ of lens 330), FCA pitch ($P_{FCA}$), and PD array pitch ($P_{PD}$) shall satisfy the following equation:

$$\frac{f_2}{f_1} = \frac{P_{PD}}{P_{FCA}}$$

This equation merely states that the optimum pitch of the photodetector array is equal to the pitch of the optical beams, after being imaged by the lens 328 and lens 330.

For the case with a 1-axis scan of the scanning mirror 324, the two-dimensional ("2D") beam array in the image space gets scanned across the 1D PD array 326. The optical power of every channel then can be identified and measured in serial by synchronizing the mirror scan and the PD output. With the PD array 326 set to the center of the beam array, a symmetric output profile can be obtained at the PD output. Every beam can be measured twice in one mirror scan cycle.

Figure 4:
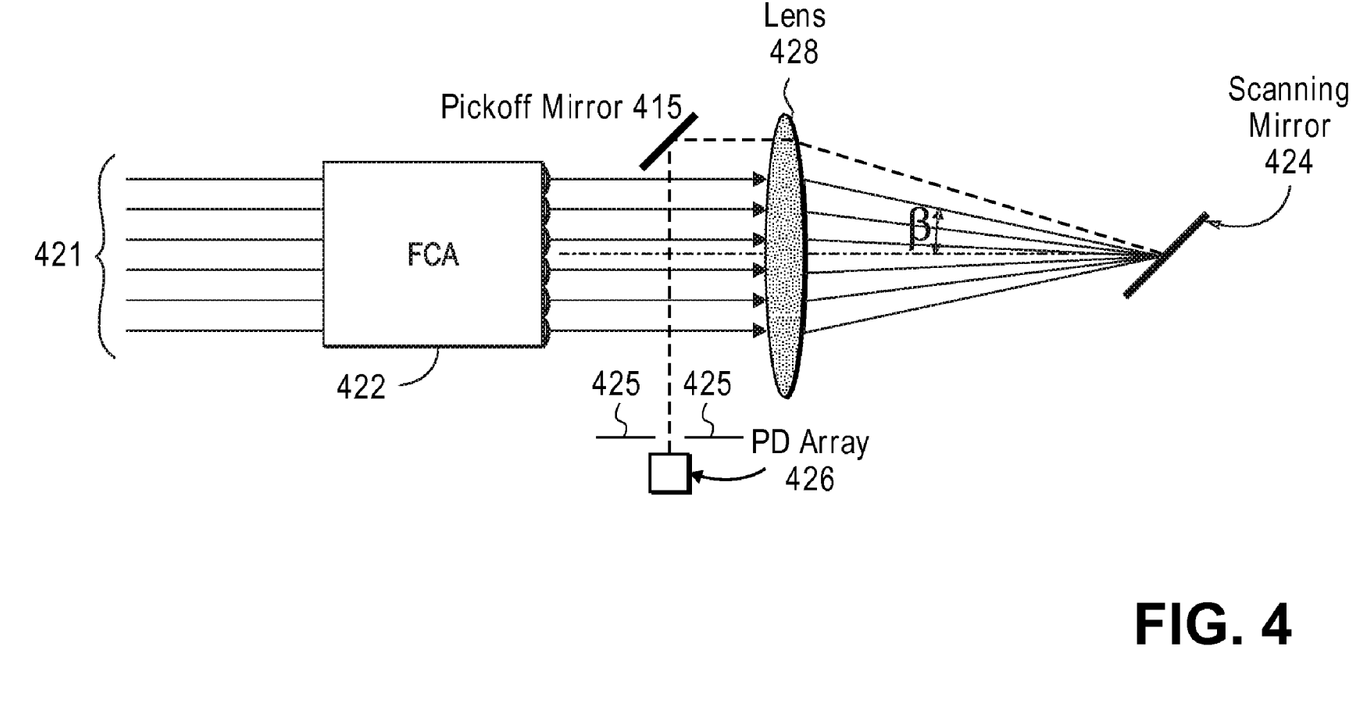
FIG. 4 shows a multi-channel bulk power detection apparatus in accordance with an embodiment of the present invention.

FIG. 4 shows a multi-channel bulk power detection apparatus in accordance with an embodiment of the present invention. The principle of operation is similar to that of the embodiment of FIG. 3, except that the optical path has been folded to eliminate one of the lenses, which substantially decreases the size of the BDP implementation. The FCA 422 collimates the tapped optical signals into an array of free space beams. These beams are parallel to each other and spatially separated from each other. Lens 428 focuses the free space beams onto scanning mirror 424. The free space beams reflect from scanning mirror 424 back through lenses 428, which collimates the free space beams in an analogous manner to lens 330 in FIG. 3. A pickoff mirror 415 then directs one free space beam at a time to each photodetector in PD array 426. The angle of scanning mirror 424 determines which free space beam is being measured at any given time. The other free space beams not being measured at a given time are absorbed by the BDP housing or an optional aperture plate 425.

The BDP housing can be fabricated by a variety of methods known to the art, including a machined metal housing and a cast metal housing. In one embodiment, the BDP is a replaceable unit, made by a separable mechanical interface between FCA 422 and the other components. For one embodiment, PD array 426 connects to external electrical interface circuitry using an electrical connector.

For another embodiment, lens 428 is a compound lens that reduces aberration by using multiple elements with different index of refraction producing a more uniform effective focal length across the lens 428.

Figure 5:
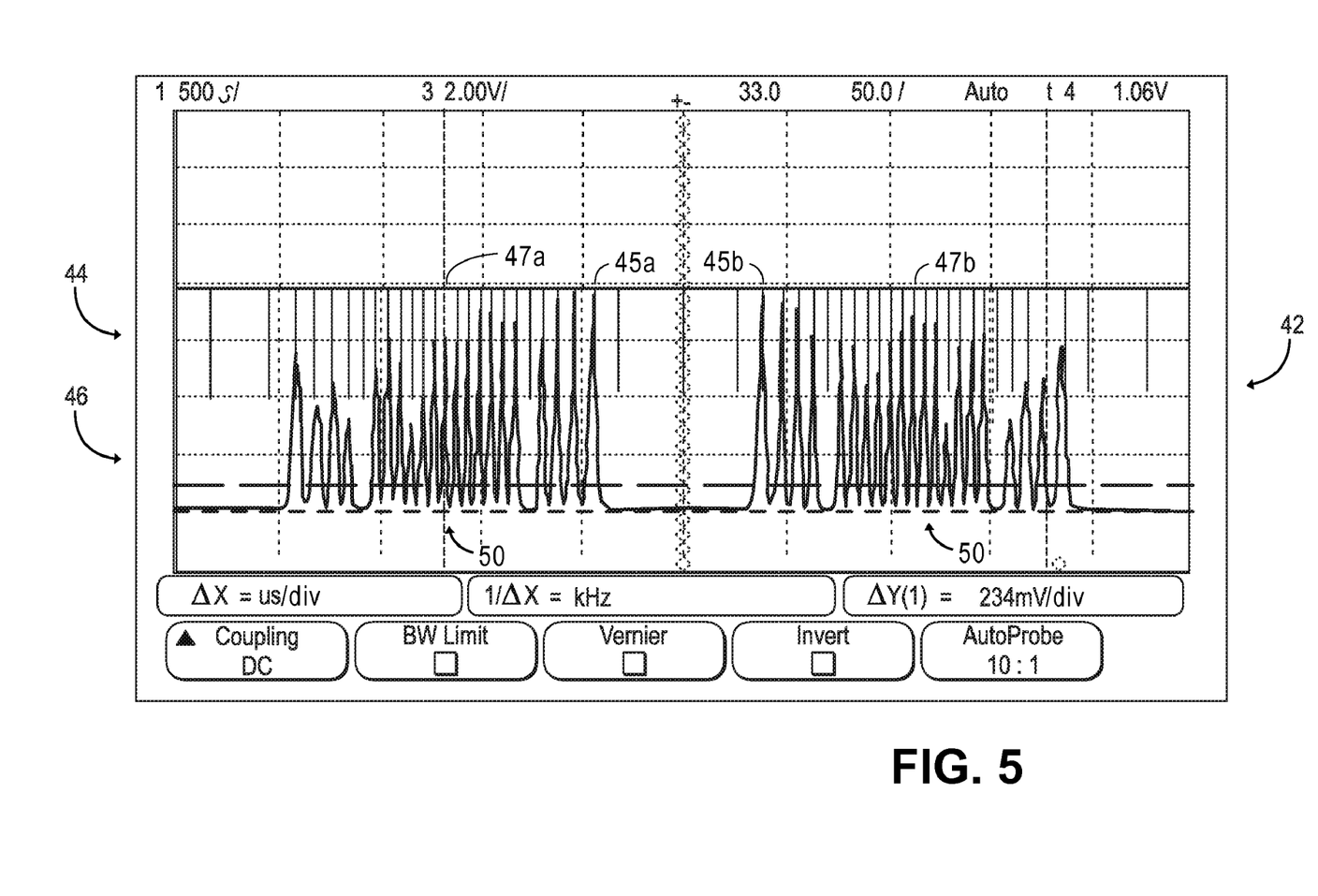
FIG. 5 illustrates the electrical output of a photodetector for one scan cycle in accordance with an embodiment of the present invention.

FIG. 5 shows output 42 of one PD as the mirror scans through one complete cycle, scanning from left of an equilibrium position 50 to right of the equilibrium position 50. Then, the mirror scans back from right of the equilibrium position 50 to left of the equilibrium position 50. The upper curve 44 shows the expected pulse locations based on the mirror scan driving signal, wherein each mark represents the time slot of a particular optical beam from a particular input fiber on that photodetector. The time slots are not uniformly spaced given that the mirror is scanned near its mechanical resonance frequency and thus the angle as a function of time is a sinusoidal function. Scanning the mirror near its resonant frequency allows very efficient mirror deflection with much less applied force than needed to deflect the mirror at any other scanning frequency.

The lower curve 46 shows the output of one photodetector measuring the power in multiple optical beams, wherein the different pulse amplitude represents different channel power levels. Due to the sinusoidal scan of the scanning mirror operated at resonance, which causes a sinusoidal variation of mirror angle as a function of time, the pulse widths of different channels vary depending on where they are in the mirror scan cycle. In a similar manner, the intervals between the measurement time slots vary.

As the mirror scans through a full cycle of deflection, a photodetector from a PD array measures the amplitude of each free space beam twice—once when scanning to the left and once when scanning to the right. Beams located at the edge of the array of free space beams are measured when the mirror angle is near its maximum value (time slots 45a and 45b), and thus are measured twice in quick succession. Beams located at the center of the array of free space beams (time slots 47a and 47b) are measured twice per scan cycle at equal time intervals. Time slots 47a and 47b can be associated with the equilibrium position 50.

The expected time slot for each optical beam to be measured shown in the upper curve 44 corresponds well to the measured time slot of the optical beam shown on the lower trace. Some of the beam measurement time slots shown in the upper curve 44 have no optical power measured in the lower curve 46 because these beams correspond to fibers that have not been supplied with input light.

There are many types of scanning mirrors, such as electrostatic microelectromechanical system ("MEMS") mirrors, electromagnetic MEMS mirrors, motor driven gimble mirrors, which are well known to those skilled in the art. One source of a scanning mirror such as the scanning mirror 324 or 424 is Hitachi High Technologies of Costa Mesa, Calif.

Figure 6:
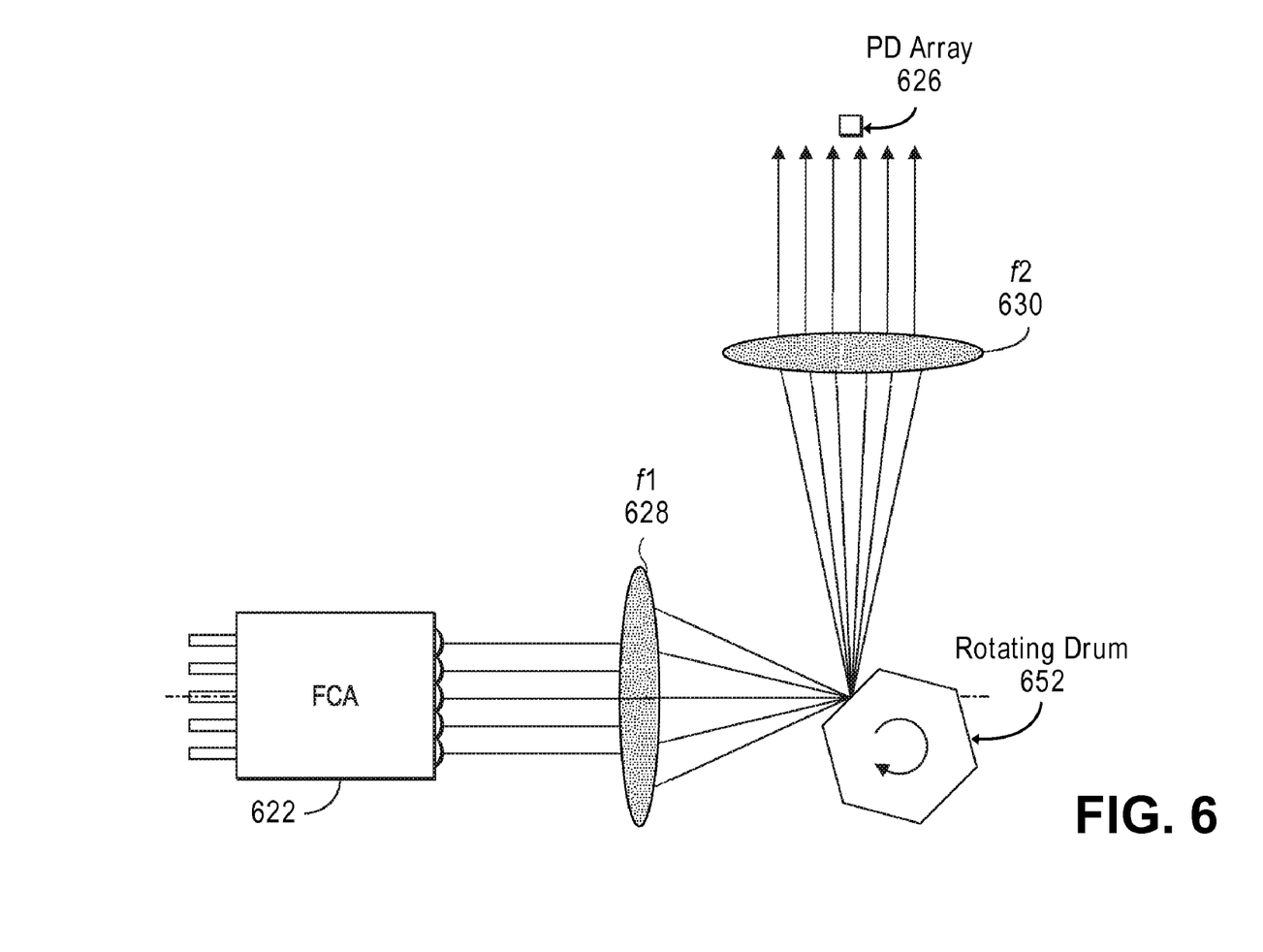
FIG. 6 illustrates a rotating drum with multifaceted reflecting surfaces used to implement a multi-channel BPD in accordance with an embodiment of the present invention.

An alternate embodiment to the BDP of FIG. 3 is shown in FIG. 6, using a rotating drum 652 with multifaceted reflecting surfaces also can be used to implement the multi-channel BPD, as shown in FIG. 5. When the drum 652 rotates around its axis, the beam array gets scanned across PD array 626 on the image plane of the optics. Besides rotating drum 652, the other optical elements in FIG. 6 are similar in operation to the embodiment of FIG. 3.

Figure 7:
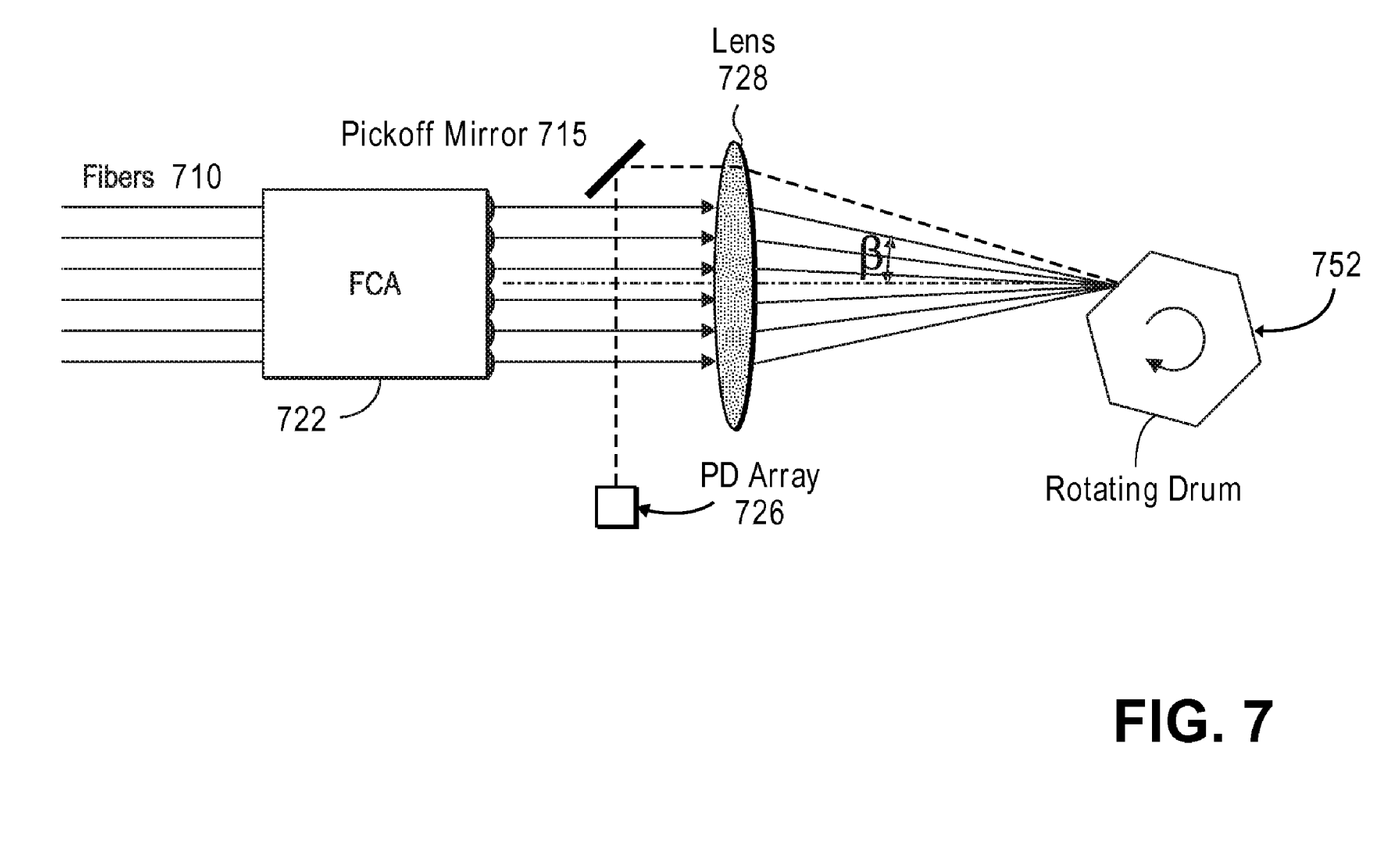
FIG. 7 illustrates a rotating drum with multifaceted reflecting surfaces used to implement a multi-channel BPD in accordance with an embodiment of the present invention.

The embodiment of FIG. 6 can also be folded optically, as shown in FIG. 7. For the alternate embodiment of FIG. 7, the FCA 722 collimates the tapped optical signals into array of free space beams. These beams are parallel to each other and spatially separated from each other. Lens 728 focuses the free space beams onto scanning mirror 724. The free space beams reflect from rotating drum 725 back through lenses 728, which collimates the free space beams in an analogous manner to lens 330 in FIG. 3. A pickoff mirror 715 then directs one free space beam to PD array 726. The angle of scanning mirror 324 determines which free space beam is being measured at any given time. The other free space beams not being measured at a given time are absorbed by the BDP housing. Pickoff mirror 715 directs a single free space beam at a time onto a photodetector of PD array 726.

The BDP can be used to measure the optical power at the input and output of an optical switch such as switch 111 or 211. For an alternate embodiment, the BDP can be used to measure the optical power in fibers 710 without the presence of an optical switch. In addition, these BDP power measurements can be used to optimize the loss of the optical switch. For the switch embodiment shown in FIG. 8, an optical switch 800 includes an input fiber array 802, an input lens array 804, input and output mirror arrays 806, 808, an output lens array 810 and an output fiber array 812. The input and output fiber blocks 802, 812 are typically comprised of a two dimensional array of fibers with polished end faces. The input fiber block 802 is positioned adjacent an input lens array 804 to provide collimated input beams. In a similar manner, the output lens array 810 is positioned adjacent to output fiber block 812 to provide collimated output beams. The input and output mirror arrays 806 and 808 each include a plurality of movable mirrors, such as mirror 807. Each mirror in the input and output mirror arrays can rotate about two orthogonal axes so that an input beam received on any one of the input fibers can be directed towards any one of the output fibers by appropriately adjusting the orientation of their associated mirrors.

In theory, the mirror arrays can be formed using a wide variety of techniques and different companies have adopted different approaches in their attempts to provide suitable mirror arrays. By way of example, one approach is to create movable mirrors by forming MEMS structures on a monolithic silicon substrate. Devices such as these are commercially available from a variety of sources, including MCNC of Research Triangle Park, N.C. and Analog Devices of Cambridge, Mass.

Figure 8:
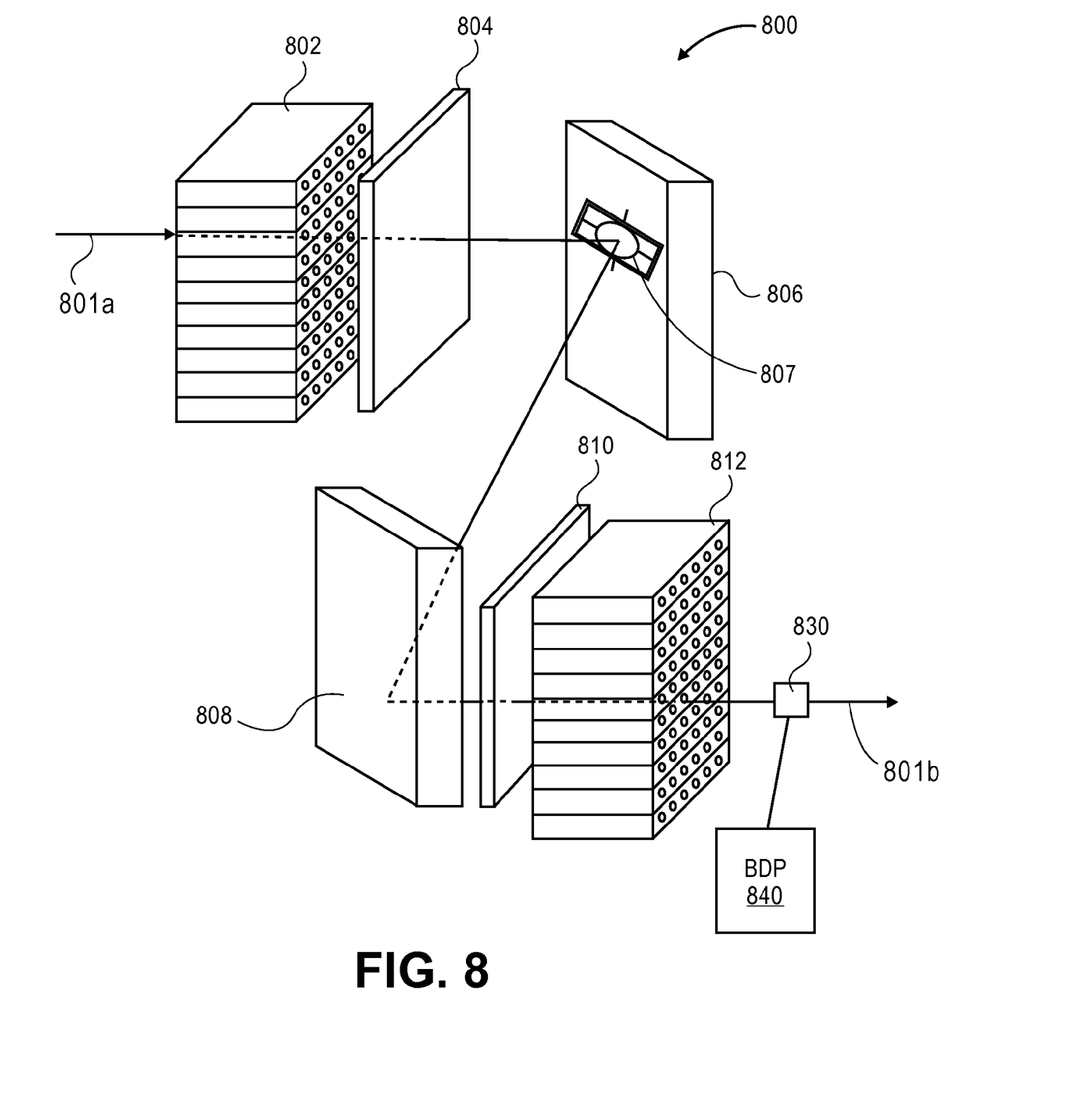
FIG. 8 shows an optical switching system in accordance with an embodiment of the present invention.

The loss of the switch depends on the precise angles of input mirrors 806 and output mirrors 808. The optical power measurement of the BDP 840 for each path of input fiber to output fiber can be used to minimize the loss by varying two input mirror angles and two output mirror angles. The minimization of a parameter like optical loss with four independent variables corresponding to the two input mirror angles and two output mirror angles using a "hill climbing" approach is a technique well known to those skilled in the art.

For example, FIG. 8 illustrates a splitter 830 tapping off a portion of the output fiber 801*b*. The BDP 840 receives this optical signal and measures the power. All of the output fibers passing through the output fiber array 812 can be tapped off with separate splitters (not shown) and these signals sent to the BDP 840 for power measurements. In a similar manner, all of the input fibers 801*a* passing through the input fiber array 802 can be tapped off with separate splitters (not shown) and these signals sent to the BDP 840 for power measurements.

Figure 9:
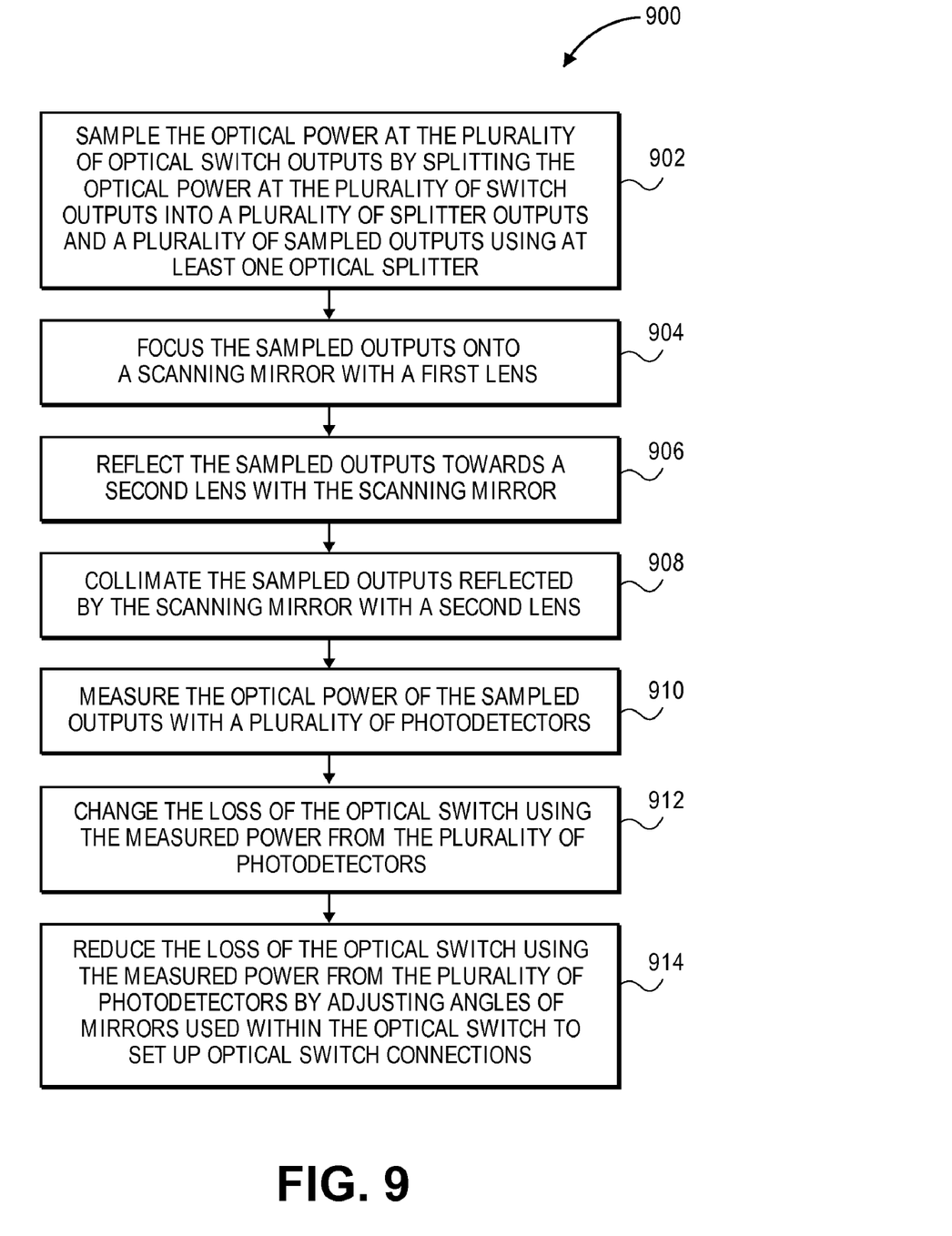
FIG. 9 is a flowchart of a method for bulk power detection in accordance with an embodiment of the present invention.

FIG. 9 is a flowchart of a method for bulk power detection in accordance with one embodiment of the present invention. The method 900 measures optical power at the output of an optical switch with a plurality of optical switch outputs. The method 900 includes sampling the optical power at the plurality of optical switch outputs by splitting the optical power at the plurality of switch outputs into a plurality of splitter outputs and a plurality of sampled outputs using at least one optical splitter at block 902. The method 900 further includes focusing the sampled outputs onto a scanning mirror with a first lens at block 904. The method 900 further includes reflecting the sampled outputs towards a second lens with the scanning mirror at block 906. The method 900 further includes collimating or reducing the divergence of the sampled outputs reflected by the scanning mirror with a second lens at block 908. The method 900 further includes measuring the optical power of the sampled outputs with a plurality of photodetectors at block 910. The method 900 further includes changing the loss of the optical switch using the measured power from the plurality of photodetectors at block 912. The method 900 further includes reducing the loss of the optical switch using the measured power from the plurality of photodetectors by adjusting angles of mirrors used within the optical switch to set up optical switch connections at block 914.

For one embodiment, the first and second lenses form a single optical element, which is a compound lens. The photodetector array may be a one dimensional array or even a single photodetector as discussed above in the present disclosure. The number of photodetectors is less than the number of sampled outputs from the switch.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An optical switching system comprising:
   a plurality of fiber-optic lines;
   an optical switch coupled to respective fiber-optic lines of the plurality of fiber-optic lines;
   a plurality of optical switch outputs coupled to the optical switch;
   a plurality of optical splitters coupled to respective plurality of optical switch outputs;
   an optical time-division multiplexer having an input coupled to the plurality of optical splitters; and
   a plurality of photodetectors coupled to an output of the optical time-division multiplexer to provide bulk optical power detection, wherein the number of photodetectors is less than the number of optical switch outputs.

2. The system of claim 1, wherein the time-division multiplexer further comprises:
   an input lens;
   a scanning mirror; and
   an output lens.

3. The system of claim 1, wherein the time-division multiplexer further comprises:
   a lens that is traversed a first time and a second time by at least one optical beam of the multiplexer; and
   a scanning mirror.

4. The system of claim 2, wherein the scanning mirror comprises a microelectromechanical system (MEMS) mirror.

5. The system of claim 2, wherein the scanning mirror comprises a motor-driven gimble mirror.

6. The system of claim 1, wherein the time-division multiplexer comprises a rotating drum with multifaceted reflecting surfaces.

7. The system of claim 2, wherein the scanning mirror scans in two axes.

8. The system of claim 2, wherein the scanning mirror scans in one axis.

9. The system of claim 1, wherein the plurality of photodetectors is comprised of a single photodetector.

10. The system of claim 2, wherein the scanning mirror has a resonant frequency, and the scanning mirror is scanned substantially at its resonant frequency.

11. An apparatus comprising:
    a plurality of fiber-optic lines;
    a plurality of optical splitters coupled to respective fiber-optic lines of the plurality of fiber-optic lines;
    an optical time-division multiplexer comprising an input lens, a scanning mirror, and an output lens with the input lens coupled to the plurality of optical splitters; and
    a plurality of photodetectors coupled to the output lens of the optical time-division multiplexer, where the number of photodetectors is less than the number of fiber-optic lines.

12. The apparatus of claim 11, wherein the scanning mirror scans in one axis.

13. The apparatus of claim 11, wherein the plurality of photodetectors comprises a single photodetector.

14. An apparatus comprising:
    an optical switch to receive signals from a fiber collimator array;
    a first lens to receive optical signals from the optical switch;

a scanning mirror to transmit optical signals from the first lens to a second lens; and a photodetector array to receive optical signals from the second lens to provide bulk optical power detection.

15. The apparatus of claim 14, wherein the input lens and the output lens are comprised of a single lens.

16. A method of measuring optical power at the output of an optical switch with a plurality of optical switch outputs, comprising:

sampling the optical power at the plurality of optical switch outputs by splitting the optical power at the plurality of switch outputs into a plurality of splitter outputs and a plurality of sampled outputs using at least one optical splitter;

focusing the sampled outputs onto a scanning mirror with a first lens;

reflecting the sampled outputs towards a second lens with the scanning mirror;

collimating the sampled outputs reflected by the scanning mirror with a second lens; and measuring the optical power of the sampled outputs with a plurality of photodetectors.

17. The method of claim 16, wherein the first lens and the second lens are comprised of a single lens.

18. The method of claim 16, further comprising changing the loss of the optical switch using the measured power from the plurality of photodetectors.

19. The method of claim 16, further comprising reducing the loss of the optical switch using the measured power from the plurality of photodetectors by adjusting angles of mirrors used within the optical switch to set up optical switch connections.

20. The method of claim 16, wherein the number of photodetectors is less than the number of sampled outputs from the switch.

* * * * *